J. T. & J. V. UPINGTON.
Sulky.
No. 222,965. Patented Dec. 23, 1879.
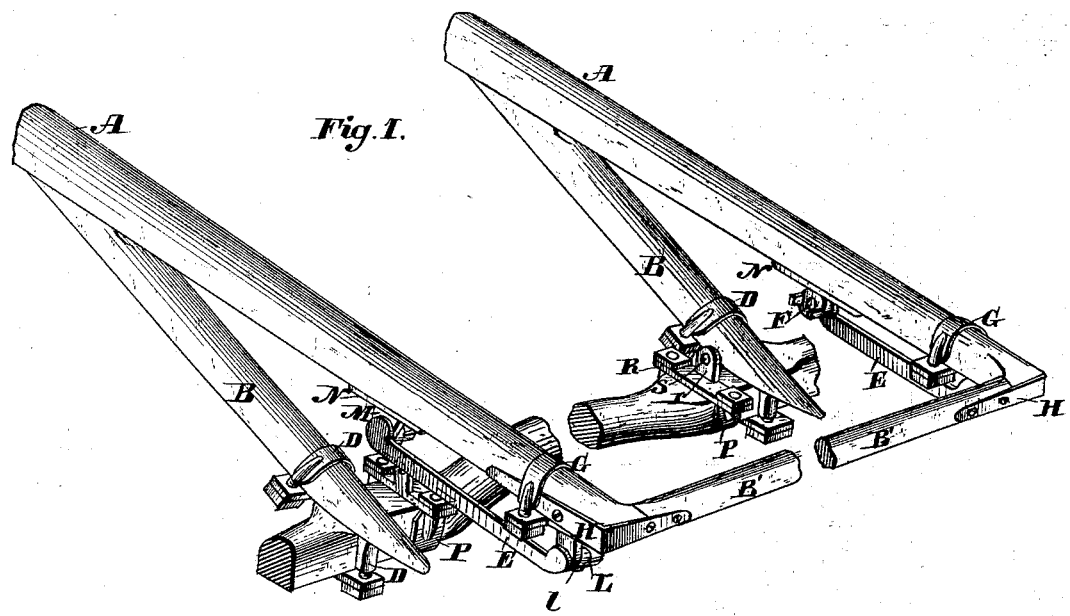
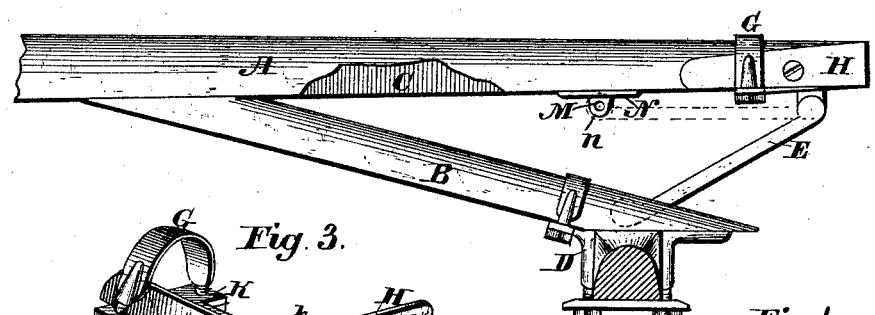
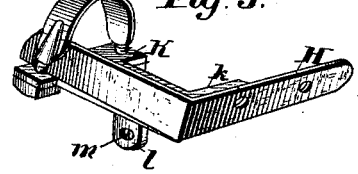
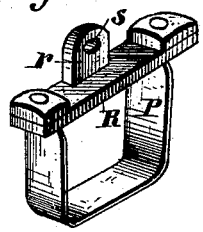
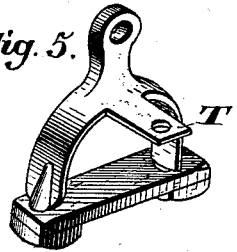
Attest:
J Henry Kaiser
J. A. Rutherford
Inventors:
Jas. T & John V Upington
By James L. Norris
Atty

UNITED STATES PATENT OFFICE.

JAMES T. UPINGTON AND JOHN V. UPINGTON, OF LEXINGTON, KENTUCKY.

IMPROVEMENT IN SULKIES.

Specification forming part of Letters Patent No. 222,965, dated December 23, 1879; application filed November 11, 1879.

*To all whom it may concern:*

Be it known that we, JAMES T. UPINGTON and JOHN V. UPINGTON, of Lexington, in the county of Fayette and State of Kentucky, have invented certain new and useful Improvements in Sulkies, of which the following is a specification.

This invention relates to certain improvements in sulkies, whereby such a vehicle can be readily adapted to be employed as a spring-sulky, or a rigid or "speeding" sulky, as may be desired; and to this end the invention consists, first, in the combination, with the springs and the shafts of a sulky, of a brace adapted to be secured to the shafts or back bar of the sulky and to the springs or axle thereof, whereby the springs may be held rigid when the vehicle is to be used as a track or speeding sulky, as more fully hereinafter specified; second, in the combination, with the shafts or back bar of a sulky, of clips secured thereto and provided with projections having eyes, to which the brace may be secured by suitable fastening devices when the vehicle is to be used as a spring-sulky; third, in an improved clip-tie having an angular extension adapted to serve as a corner-plate for the connecting-joint of the shafts and back bar, and provided with a projection having an eye for connecting with one end of the brace; fourth, in combination with the axle of a clip and clip-tie, the latter being provided with a projection having an eye connecting with one end of the brace, for rendering the parts rigid when the vehicle is used as a rigid or speeding sulky, as more fully hereinafter specified; fifth, in the combination, with the shafts, back bar, and their corner-plates, of clips and clip-ties having angular extensions, which serve as additional corner-plates to strengthen the shafts and back bar at the joints.

In the drawings, Figure 1 represents a perspective view of a sulky, showing our invention, in which the brace is disconnected from the axle and secured to the shaft out of the way, in order to permit the vehicle to be used as a spring-sulky. Fig. 2 represents a side view, partly in section, showing the brace connected to the shaft and axle to hold the parts rigid. Fig. 3 represents a detached view of the combined clip-tie and corner-plate for the shafts and back bar; Fig. 4, a detached view of the clip and clip-tie for securing the brace to the axle, and Fig. 5 a view of a modification of said axle-clip and clip-tie.

The letter A indicates the shafts of the vehicle; B, the springs thereof; and B′, the back bar, which are constructed of wood in the usual manner, and which may be re-enforced by inlaid strips of metal, as indicated at C.

The rear ends of the springs are secured to the axle by means of a clip, D, or in any other convenient manner.

The letter E indicates a brace consisting, in the present instance, of a metal rod provided at its ends with screws F, extending at right angles from said rod, for the purpose hereinafter explained.

The letter G indicates a clip fastened over each shaft near the end of the same, and over one end of a lower plate, H, secured to the shaft and the back bar I. The said clip is held by a clip-tie, K, which is formed with an angular extension, $k$, which serves as a corner-plate to connect the lower sides of the shaft and back bar and impart additional strength to the joint. The said extension of the clip-tie is provided with a stud or projection, $l$, having an eye, $m$, through which one of the screws at the end of the brace is adapted to pass, the said brace being fastened in place by means of the screw-nuts L, which are secured to the projecting ends of the screws on the brace.

The letter M indicates a stud or projection on a plate, N, attached to the lower side of the shaft. The said stud is provided with an eye, $n$, through which the screw at the opposite end of the brace may be passed, and in which it may be fastened to hold the brace out of the way when not in use.

The letter P indicates a clip secured to the axle by means of a clip-tie, R, which is provided with a stud or projection, $r$, having an eye, $s$, through which the screw at one end of the brace may be passed, and in which it may be fastened to hold the parts rigid when it is desired to employ the vehicle as a track or speeding sulky.

In the modification shown in Fig. 5 the clip, instead of the clip-tie, is provided with a projection and eye to hold the brace, and with a lateral arm, T, through which a screw or screw-bolt may be passed as an additional means of securing it to the axle. The clip in this modification should be secured to the axle in such manner that the stud will project upwardly, so that the eye will receive the end of the brace.

The various clips and their attachments, besides serving as connections for the brace, also serve to hold the inlaid re-enforce C securely in place, the spring at its junction with the shaft serving the purpose of securing one end of the re-enforce in its recess.

It is evident that the form of the brace may be variously modified according to taste or fancy, and that innumerable other means than those herein described may be employed to fasten the brace in position, without departing from our invention. For instance, the ends of the brace may be formed with openings in lieu of the present construction, and a screw bolt and nut may be employed for connecting the brace to the projections. Moreover the brace, instead of being attached to the shafts and axle, may be attached to the back bar and axle, or to the shaft and springs, and will still answer the purpose intended, and fulfill the principles of our invention. We therefore do not limit ourselves to the precise features of construction herein described and shown.

What we claim is—

1. The combination, with the springs and shafts of a sulky, of a brace adapted to be secured to the shafts or back bar of the sulky and to the spring or axle of the same, whereby the springs are held rigidly when the vehicle is to be used for a speeding or track sulky, substantially as specified.

2. In combination with the shafts or back bar of a sulky, the clips provided with projections having eyes for the reception of the brace, and devices for fastening the brace therein when the vehicle is to be used as a spring-sulky, substantially as specified.

3. A clip-tie having an angular extension adapted to serve as a corner-plate to strengthen the connecting-joint of the shafts and back bar, substantially as specified.

4. In combination with the axle and the brace connecting the shaft or back bar to said axle, a clip and clip-tie, the latter being provided with a projection having an eye to receive one end of the brace, substantially as specified.

5. In combination with the shafts, back bar, and their corner-plates, the clips and clip-ties, the latter having angular extensions, serving as an additional corner-plate to strengthen the shaft and back bar at the joint, substantially as specified.

In testimony that we claim the foregoing we have hereunto set our hands in the presence of the subscribing witnesses.

JAS. T. UPINGTON.
JOHN V. UPINGTON.

Witnesses:
SILAS WOLVERTON,
D. S. McFARLAND.